3,677,989
ETHYLENE/ACRYLIC ACID COPOLYMER
EMULSIONS
Richard D. Jenkinson, St. Albans, W. Va., assignor to
Union Carbide Corporation
No Drawing. Continuation of application Ser. No.
676,730, Oct. 20, 1967, which is a continuation of
application Ser. No. 331,922, Dec. 19, 1963. This
application June 16, 1970, Ser. No. 48,906
Int. Cl. C08f 3/42
U.S. Cl. 260—29.6 H                    2 Claims

ABSTRACT OF THE DISCLOSURE

The present invention relates to the process for producing an aqueous ethylene/acrylic acid emulsion comprising mixing a random interpolymer of ethylene and acrylic acid, said interpolymer containing from 2 to 30 weight percent polymerized acrylic acid and having a melt index of from 1 to 1000 decigrams per minute with an emulsifying amount of an alkali metal hydroxide and from 5 to 25 weight percent, based on the weight of said copolymer, of water, heating said mixture with agitation to a temperature of about 150 to 200° C. and adding sufficient water to provide an emulsion containing no greater than about 50 weight percent of said copolymer.

Emulsions containing the aforementioned ethylene copolymers are also disclosed.

---

This application is a continuation application of Ser. No. 676,730, filed Oct. 20, 1967 which in turn is a continuation application of Ser. No. 331,922, filed Dec. 19, 1963, both now abandoned.

This invention relates to aqueous emulsions of copolymers of ethylene and acrylic acid. More particularly, this invention relates to aqueous ethylene/acrylic acid emulsions which are free of emulsifying agents.

Ethylene homopolymers and copolymers have found wide utility in various coating, laminating and adhesive applications. The main difficulty with the use of such polymers in these applications has been in the application of the polymer. Generally, coatings and the like have been applied by extrusion of molten polymer to the surface to be coated, although solutions of the polymer in high boiling organic solvents have also been employed. More recently, various aqueous ethylene polymer latexes have been developed. Although these latexes are easily applied and do not involve the use of toxic or flammable organic solvents, they have not been entirely satisfactory due to the requirement for large quantities of emulsifying agents. These emulsifying agents adversely affect the physical properties of the polymer film after evaporation of the water. In addition, in the case of polymers having excellent adhesive properties, such as ethylene/acrylic acid copolymers, the presence of the emulsifying agents tends to impair the adhesion of the polymer to the substrate.

It has been unexpectedly and surprisingly found by this invention, however, that when ethylene/acrylic acid copolymers are admixed with water and a water-soluble base, there is obtained a clear, stable, non-creaming emulsion. Films are readily cast from the emulsion and, after a moderate fusion step, such as heating at 350° C. for about 5 minutes, are continuous and free from impurities and have excellent adhesion to a variety of substrates.

The emulsions of this invention consist essentially of water, up to about 50 weight percent, based on the total weight of the emulsion, of an ethylene and acrylic acid copolymer, and an emulsifying amount of a water-soluble base.

The ethylene/acrylic acid copolymer employed in the emulsion of this invention are produced by methods known to the art. One such method comprises contacting ethylene, acrylic acid and a free radical catalyst, such as a peroxide, under conditions of elevated temperature and pressure.

The copolymers generally contain a major; i.e., greater than about 50 weight percent, portion of ethylene. It is preferred, however, that the polymer contain from about 2 to about 30 weight percent polymerized acrylic acid, with amounts of from about 8 to about 22 weight percent acrylic acid being particularly preferred.

The melt index of the polymer can carry from about 1 to about 1000 decigrams per minute or higher, as determined by ASTM D-1238-57T. Copolymers having melt indexes of at least 10 decigrams per minute are preferred, however, because they more readily form stable emulsions of small particle size. Melt indexes of from about 25 to about 120 decigrams per minute are particularly preferred.

To achieve uniform, clear, gel-free, stable emulsions in accordance with this invention it has also been found that the copolymer must be uniform; i.e., the polymerized acrylic acid must be uniformly and randomly distributed along the copolymer molecule, and that each polymer macromolecule must contain substantially the same proportions of polymerized comonomer as the other macromolecules.

Thus, because the acrylic acid polymerizes more rapidly than ethylene, the polymerization must be accomplished under substantially uniform conditions of temperature, pressure and monomer concentration.

The desired polymerization conditions are generally obtained by continuously feeding ethylene, acrylic acid and a peroxide catalyst at a temperature below that at which the polymerization is conducted to a polymerization zone and continuously withdrawing polymer from the polymerization zone, while maintaining substantially constant conditions of temperature, pressure and comonomer concentration in said polymerization zone.

The polymerization is conducted at a temperature of about 170° C. to about 250° C. with temperatures in the range of 190° C. to 230° C. being preferred. The reaction pressure can vary from about 12,000 to about 30,000 p.s.i. with pressures of from 15,000 to 27,000 p.s.i. being preferred. The average contact time at these conditions can vary from about 0.5 to about 5 minutes, preferably from 1 to 4 minutes.

As indicated above, the conditions in the reaction zone must be substantially constant to obtain random interpolymers of ethylene and acrylic acid. Thus, the temperature throughout the reaction zone must be maintained within 10° C. and preferably within 5° C. of the average temperature. The average temperature is maintained at the preselected value by slight adjustments in pressure, with temperature increasing with increasing pressure. Although this can be effected by any means known to the art, it has been found that the pressure must also be relatively constant and should not vary by more than 500 p.s.i. from the selected value. Accordingly, it is preferred that the pressure be controlled by the use of a throttle valve in the polymer outlet from the reactor. The use of this type of valve permits the frequent small adjustments necessary to the maintenance of uniform temperature and pressure.

Uniformity of temperature and composition of the reaction mixture throughout the reaction is readily maintained by the use of a high degree of agitation coupled with the use of multiple points of feed to the reaction zone.

The monomers, catalyst and, if desired, a diluent or solvent, can be mixed prior to being fed to the reactor or can be fed separately, provided all feed rates are substantially constant. It has been found that the temperature of the feed components is important to the maintenance and control of uniform polymerization conditions, and should be in the range of from about 10° C. to about 150° C., preferably from 30° C. to 70° C., and at least 60° C., preferably at least 100° C., below the reaction temperature. When this condition is observed the exothermic heat of reaction is consumed by heating up the feed. Moreover, the degree of conversion can be controlled by controlling feed temperature, with conversion increasing as the difference between the feed and reaction temperatures increases. This results from the fact that, when more heat is required to raise the feed to the reaction temperature, the rate of polymerization will increase to supply the heat. In the situation where the various components are fed separately to the reactor, the "feed temperature" is the temperature of a mixture resulting from mixing the components at their respective feed temperatures, disregarding the temperature of mixing.

The amount of acrylic acid fed to the reaction can vary from 0.1 to 5 mole percent, based on ethylene feed, with amounts of from 0.25 to 4.0 mole percent preferred.

The catalysts which are employed in the polymerization process are peroxide catalysts which form free radicals under the reaction conditions, such as di-tert-butyl peroxide, di-α-cumyl peroxide, dibenzoyl peroxide and the like. Oxygen cannot be employed, however, and, although azo-type catalysts theoretically can be employed, they are generally too unstable at the reaction temperatures to be of practical use. The amount of catalyst employed can vary from 0.5 to 500 p.p.m., based on ethylene, with from 5 to 50 p.p.m. preferred.

Inert diluents or solvents, such as isooctane, benzene and the like can be present in amounts of up to about 50 weight percent or more if desired. Although they are not necessary it is preferred to charge the catalyst to the reaction zone in solution in up to about 10 weight percent, based on monomers fed, of a solvent to permit accurate control of catalyst concentration.

The product is recovered from the reaction by methods known to those skilled in the art.

The degree of uniformity of the ethylene/acrylic acid copolymer can be determined by infrared analysis, with the spectra from the uniform interpolymers of this invention being characterized by the substantial absence of absorption bands at 7.9, 8.9, 9.1, 10.1 and 12.6$\mu$. These bands are present in the non-uniform copolymers produced by the continuous processes of the prior art. In addition, the uniform interpolymers have glass transition temperatures in the range of from 20 to 27° C., whereas non-uniform polymers produced by batch methods have glass transition temperatures of about 40° C., and those produced in the continuous tubular reactor have glass transition temperatures of about 70° C.

The "glass transition temperature," as employed herein, is defined as that temperature at which the curve obtained from a plot of mechanical loss against temperature is a maximum.

The polymers produced in the manner described above are termed "random interpolymers." By the term "random interpolymer" as employed herein, is meant a copolymer each of whose macromolecules contains substantially the same proportions of polymerized comonomers and the comonomers are randomly distributed along the polymer macromolecule rather than grouped in blocks of substantially one monomer.

The water-soluble bases which are employed in producing the emulsions of this invention are the alkali metal hydroxides, i.e., lithium hydroxide, sodium hydroxide, potassium hydroxide, rubidium hydroxide, and cesium hydroxide. Ammonium hydroxide is also suitable and is intended to be included by the term "alkali metal hydroxide."

The amount of alkali metal hydroxide sufficient to emulsify the ethylene/acrylic acid copolymer can vary from about 30 to 100 mole percent of the polymerized acrylic acid in the copolymer, with amounts of from 40 to 60 mole percent being preferred. The resulting emulsion has a pH of greater than 7 and generally in the range of from 7.2 to 10.5. In general, as the amount of base increases the particle size of the ethylene/acrylic acid copolymer in the emulsion decreases, and will vary from about 0.02 to about 20 microns over the alkali metal hydroxide ranges set forth above.

The emulsions of this invention are produced by first preparing a "water-in-oil" emulsion of the copolymer, base and water, employing from about 5 to about 25 weight percent, based on the copolymer, of water. This mixture is heated to about 150–200° C., preferably 160–180° C., with stirring, to ensure thorough mixing of the components. Water is then added, with stirring, to provide an "oil-in-water" emulsion having a solid content of less than about 50 weight percent. A high degree of agitation during the inversion of the phases is required to ensure that the copolymer particles are of less than about 0.1 micron. A greater degree of agitation is also required for polymers having low melt indexes or low amounts of acrylic acid than for high melt index, high acrylic acid-content polymers.

In addition to ethylene and acrylic acid the copolymers employed in the emulsions can contain up to about 20 weight percent of one or more additional polymerizable monomers.

As examples of suitable additional monomers one can mention the vinyl and vinylidene halides such as vinyl chloride, vinylidene chloride, vinylidene bromide and the like; vinyl esters such as vinyl formate, vinyl acetate, vinyl propionate, vinyl butyrate, vinyl chloroacetate, vinyl chloropropionate, and the like; alpha, beta-unsaturated acids and their derivatives such as chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, N-methyl acrylamide, N,N-di-methyl acrylamide, N-methyl methacrylamide, N,N-dimethyl methacrylamide, acrylonitrile, chloroacrylonitrile, methacrylonitrile, ethacrylonitrile, and the like; maleic and fumaric acids, and their esters such as dimethyl maleate, diethyl maleate, monobutyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; N-methyl-N-vinyl acetamide, N-vinyl carbazole, N-vinyl pyrrolidone, ethyl methylene malonate; polymerizable cycloolefins such as bicyclo[2.2.2]oct-2-ene, their 5-substituted compounds and the like, bicyclo[2.2.1]hepta-2,5-diene, bicyclo[2.2.2]octa-2,5-diene, et cetera.

The emulsions of this invention are useful for producing coatings, as primers, as ingredients for water-based printing inks, extenders for concrete, asphalt, mortar and the like, etc. In addition, one can add dyes, pigments, emulsifiers, and other additives, as well as compounds such as epoxide compounds or methylol-containing resins to permit the formation of a cross-linked coating on baking.

The following examples are illustrative:

EXAMPLE 1

To a 2-liter stirrer-equipped autoclave were charged 100 grams of a 78/22 ethylene/acrylic acid copolymer having a melt index of 120 dgm./min., 8 grams of an aqueous ammonium hydroxide solution (28 weight percent ammonia in water) and about 10 grams of water. The mixture was heated, with stirring, to 160° C. and after 10 minutes at 160° C., 176 grams of water were added at a rate of 810 ml./hr. After cooling to room temperature, there was recovered a clear emulsion containing about 35 percent solids. The particles had a substantially uniform size of less than 0.1 micron, as determined by electron micrograph. The copolymer did not settle out on the addition of a 1 percent aqueous solution sodium chloride or on standing for over 6 months.

EXAMPLES 2-5

Employing procedures similar to those described in Example 1, except that the temperature employed was about 180° C., several stable emulsions were prepared, using ammonium and potassium hydroxides as the bases. The compositions of these emulsions are set forth in tabular form below.

| Examples | 2 | 3 | 4 | 5 |
|---|---|---|---|---|
| Copolymer: | | | | |
| Weight, grams | 100 | 100 | 100 | 100 |
| Acrylic acid, wt. percent | 8 | 14 | 14 | 27 |
| Melt Index, dgm./min | 79 | 24 | 170 | 15 |
| Base | KOH | KOH | KOH | *NH$_4$OH |
| Weight, grams | 6 | 4 | 6 | 20 |
| Water, grams | 186 | 186 | 186 | 186 |

*28 percent NH$_3$ in water.

EXAMPLE 6

Employing apparatus and procedures similar to those described in Example 1, there was produced a clear stable emulsion of an 86.3/5.7/9 ethylene/vinyl acetate/acrylic acid terpolymer.

What is claimed is:

1. The process for producing an aqueous ethylene/acrylic acid emulsion comprising mixing a uniform random interpolymer of ethylene and acrylic acid, said interpolymer containing from 2 to 30 weight percent polymerized acrylic acid and having a melt index of from 1 to 1000 decigrams per minute with an alkali metal hydroxide from 30 to 100 mole percent of the polymerized acrylic acid in said interpolymer and from 5 to 25 weight percent, based on the weight of said copolymer, of water, heating said mixture with agitation to a temperature of about 150 to 200° C. and adding suffiicent water to provide an emulsion containing no greater than about 50 weight percent of said copolymer.

2. The process for producing an aqueous emulsion comprising mixing a random interpolymer of ethylene and acrylic acid said interpolymer containing from 2 to 30 weight percent polymerized acrylic acid and having a melt index of from 1 to 1000 decigrams per minute with up to a stoichiometric amount of an alkali metal hydroxide based on polymerized acrylic acid and from 5 to 25 weight percent, based on the weight of said copolymer, of water, heating said mixture with agitation to a temperature of about 150 to 200° C. and adding sufficient water to provide an emulsion containing no greater than about 50 weight percent of said interpolymer.

References Cited

UNITED STATES PATENTS

| | | | |
|---|---|---|---|
| 3,436,363 | 4/1969 | Helin | 260—29.6 X A |
| 3,437,626 | 4/1969 | Glabisch | 260—29.6 H |
| 3,485,785 | 12/1969 | Anspon | 260—29.6 H |
| 3,092,600 | 6/1963 | Ozawa | 260—29.6 |
| 3,000,840 | 9/1961 | Johnson | 260—29.6 H |
| 2,980,615 | 4/1961 | Glass | 260—80.3 |
| 3,029,228 | 4/1962 | Glavis | 260—86.1 |
| 3,030,321 | 4/1962 | Lombardi | 260—29.6 H |
| 3,030,342 | 4/1962 | Tiefenthal | 260—29.6 H |
| 3,085,077 | 4/1963 | Floyd | 260—29.6 X A |
| 3,084,070 | 4/1963 | Teot | 260—29.6 H |
| 3,249,570 | 5/1966 | Potts | 260—29.6 |
| 3,347,811 | 10/1967 | Bissot | 260—29.6 |
| 3,255,130 | 6/1966 | Keim | 260—8 |
| 3,337,488 | 8/1967 | Lyons | 260—29.6 |

FOREIGN PATENTS

| | | |
|---|---|---|
| 249,759 | 9/1962 | Australia. |
| 496,650 | 10/1953 | Canada. |

PAUL LIEBERMAN, Primary Examiner

U.S. Cl. X.R.

260—29.6 L, TA, 66, 78.5 BB, HC, T, 80.6, 80.72, 80.73, 80.76, 80.8, 80.81, 88.1 PC, 94.9 A